UNITED STATES PATENT OFFICE.

CHARLES WRIGLEY, OF CHICAGO, ILLINOIS.

WELDING COMPOUND.

SPECIFICATION forming part of Letters Patent No. 426,897, dated April 29, 1890.

Application filed February 15, 1890. Serial No. 340,522. (No specimens.)

*To all whom it may concern:*

Be it known that I, CHARLES WRIGLEY, a citizen of the United States, residing at Chicago, in the county of Cook and State of Illinois, have invented certain new and useful Improvements in Welding Compounds, which are fully set forth in the following specification.

My invention consists in forming a welding compound in the form of a dry powder which is specially adapted to the welding of steel; and to obtain said ends I manufacture my compound in the manner described, substantially of the following ingredients and proportions of parts as experience has proved to be the most serviceable—namely, as an example: I take ten ounces of borax and one ounce of sal-ammoniac, each first finely powdered and then intimately mixed, after which they are melted together and allowed to cool and solidify. After this new substance is thoroughly cooled and solid it is again powdered into a quite fine powder, after which one-half ounce of finely-powdered rosin is then intimately mixed with said powder in a dry and cold state, after which the compound is ready for use.

This powder is applied like any other powder, as borax, or other like substance used in welding iron.

What I claim is—

1. A welding compound consisting of borax, sal-ammoniac, and rosin, in the proportions substantially as specified.

2. A welding compound consisting of borax and sal-ammoniac, combined by heat and formed into a powder and mixed with powdered rosin, in about the proportions substantially as specified.

3. The process of manufacturing the above-described welding compound, which consists in powdering, mixing, and melting borax and sal-ammoniac and allowing the said mixture to solidify, and then powdering and mixing it with powdered rosin, substantially as specified.

CHARLES WRIGLEY.

Witnesses:
WM. ZIMMERMAN,
T. E. VOGEL.